Aug. 11, 1959 N. S. JAPOLSKY 2,898,864
ROTARY PUMPS
Filed Dec. 27, 1956 6 Sheets-Sheet 6

United States Patent Office 2,898,864
Patented Aug. 11, 1959

2,898,864
ROTARY PUMPS

Nicholas S. Japolsky, Highgate, London, England, assignor to Nicotron Developments Limited, London, England, a British company Application December 27, 1956, Serial No. 630,802

10 Claims. (Cl. 103—149)

This invention relates to rotary pumps of the kind comprising a central driving shaft, at least one roller connected to the shaft so as to be driven by the latter in such a manner that the roller axis rotates about the axis of the shaft, and at least one conduit for the fluid to be pumped, said conduit having walls formed of resilient material and extending around said shaft and being enclosed by a supporting casing, the arrangement being such that the or each roller can contact the conduit walls and, upon rotation of said shaft, can produce a moving constriction in the conduit resulting in a series of peristaltic pumping waves.

A pump of the kind referred to is a unidirectional flow pump which is suitable for pumping gases or liquids, and which may be used as a compression pump or an evacuation pump.

According to the invention there is provided a pump of the kind referred to, wherein the, or each roller is arranged for rotation about its axis and for movement in a direction radial to said shaft, the arrangement being such that, when the shaft is rotating the, or each roller moves radially outward from the shaft and deforms the conduit walls as a result of centrifugal action.

For a better understanding of the invention, and to show how the same may be carried into effect, reference will now be made to the accompanying drawings in which.

Figure 3:
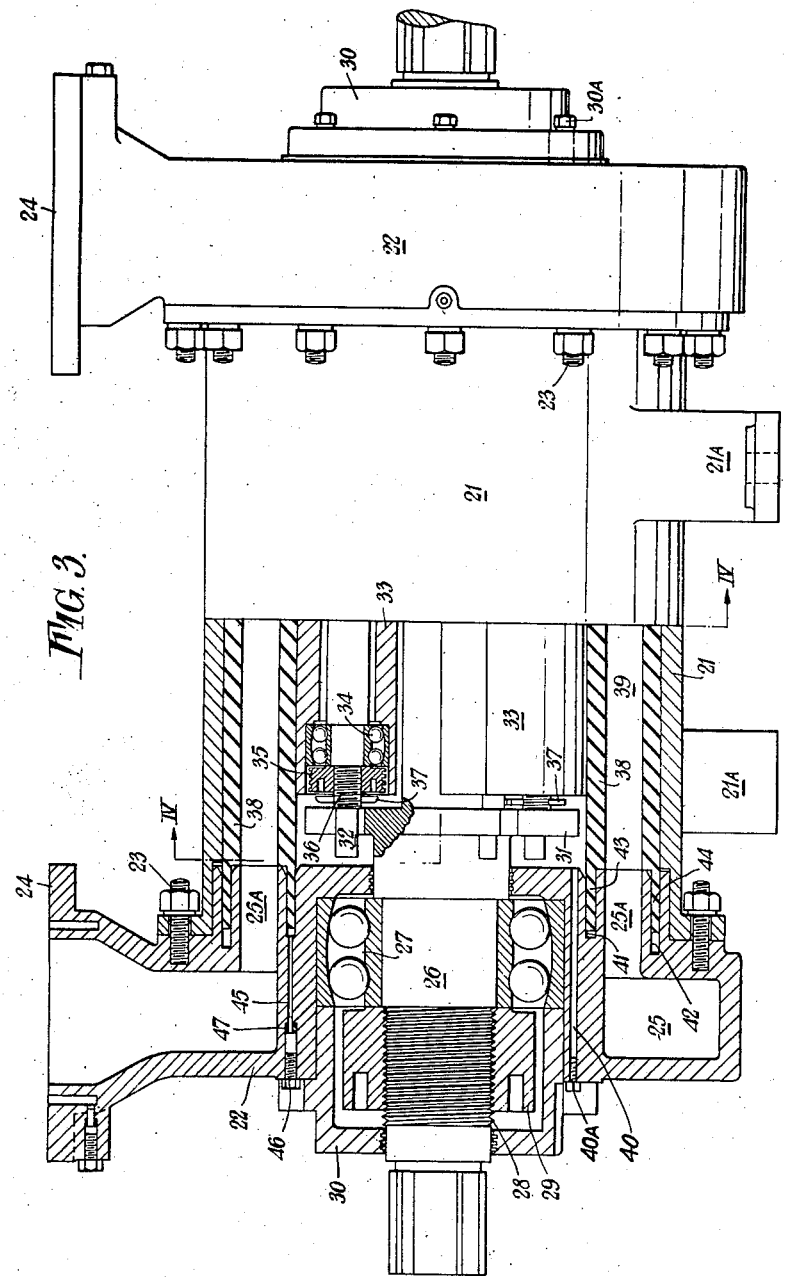
Figure 3 is a part-sectional elevation of a modification of the pump shown in Figures 1 and 2.
Figure 4:
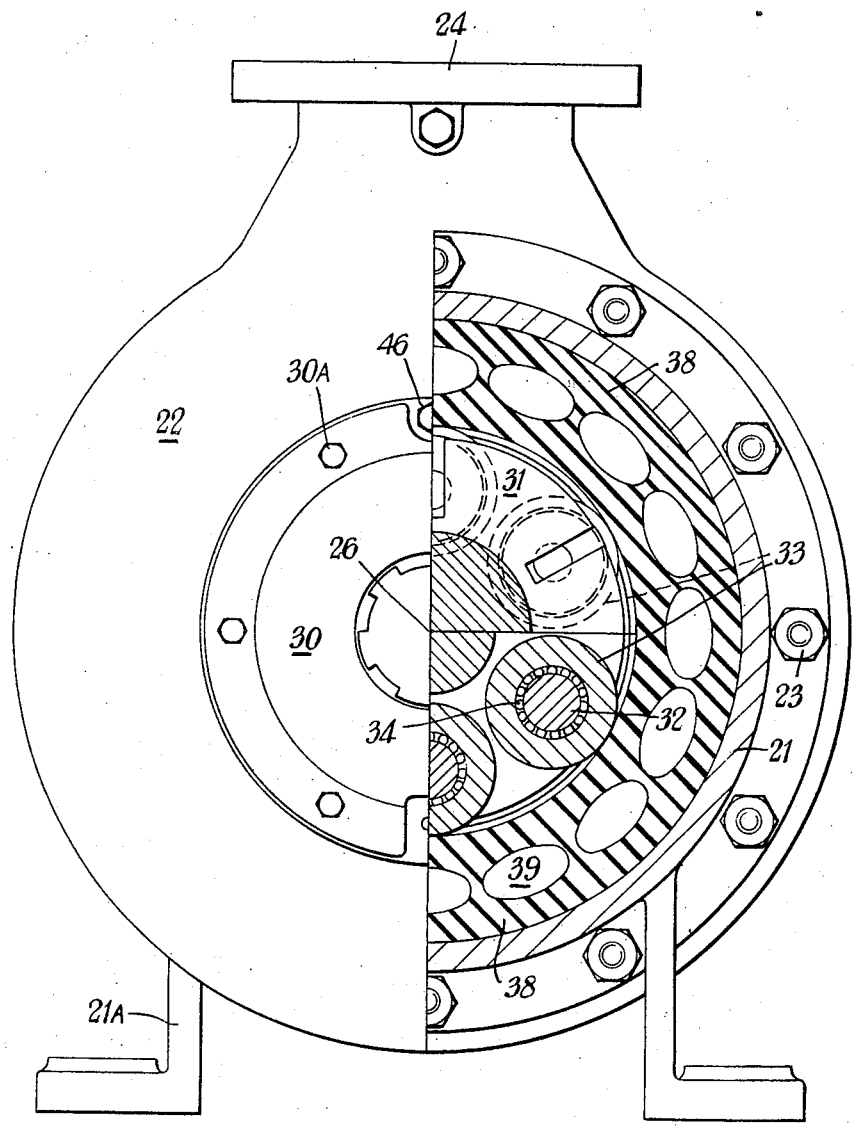
Figure 5:
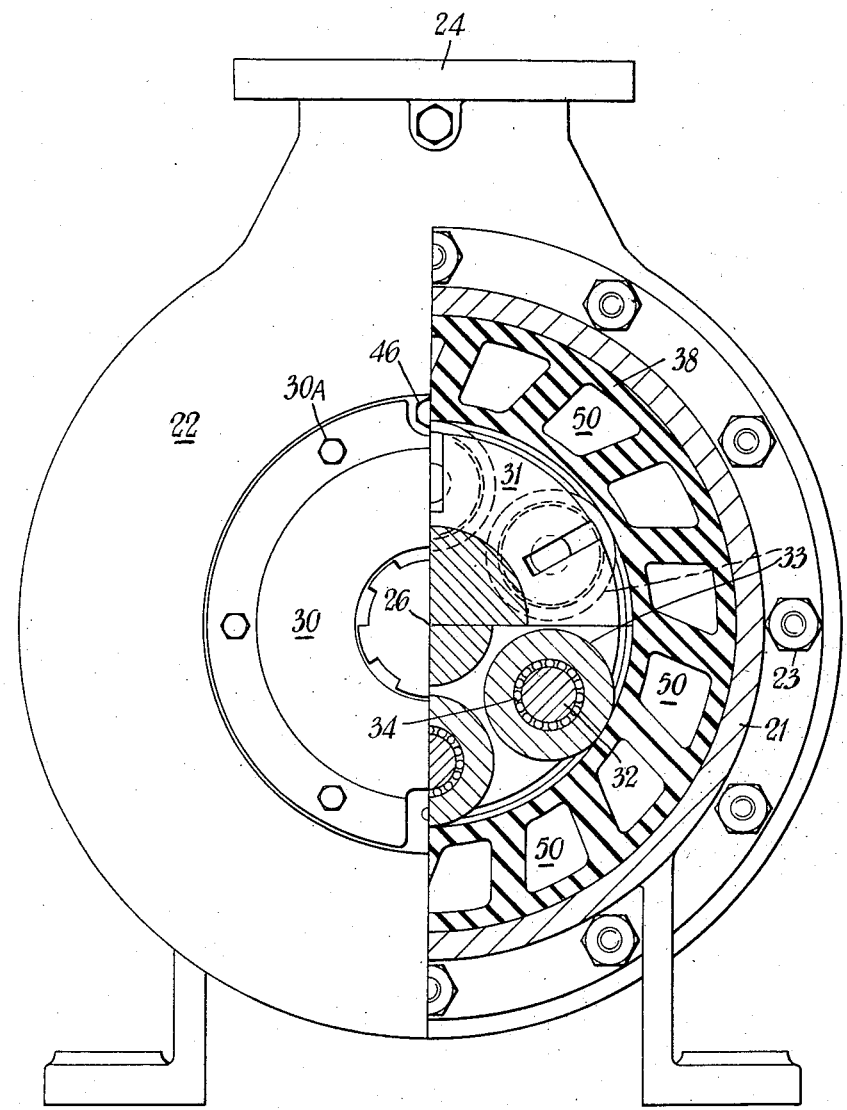
Figure 6:
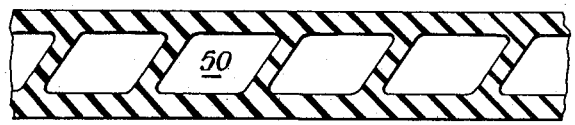
Figure 7:
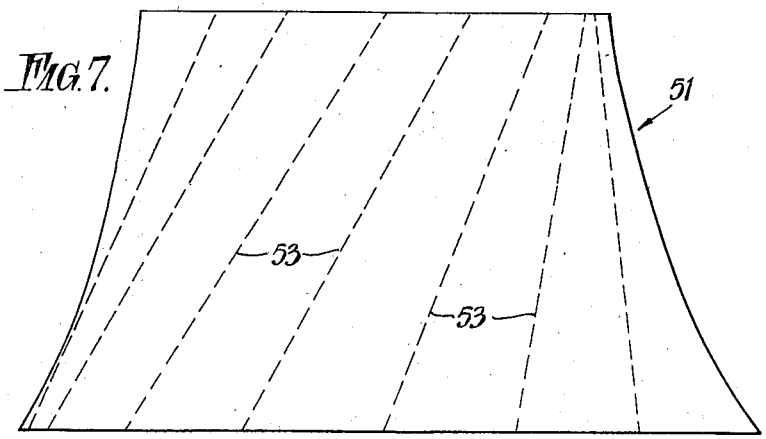
Figure 8:
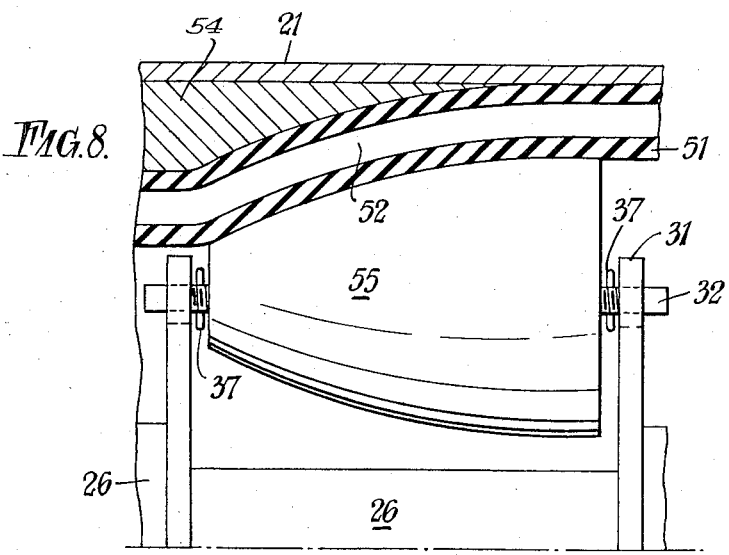

Figure 4 is a half-sectional end view of the pump shown in Figure 3, the section being taken on the line IV—IV of Figure 3, Figure 5 is a view corresponding to Figure 4 of a further modification, Figure 6 is a diagrammatic cross-sectional view of part of the modification shown in Figure 5, Figure 7 is a side view of a part of yet a further modification, and Figure 8 is a sectional view of part of a further pump incorporating the modification shown in Figure 7.

Figure 1:
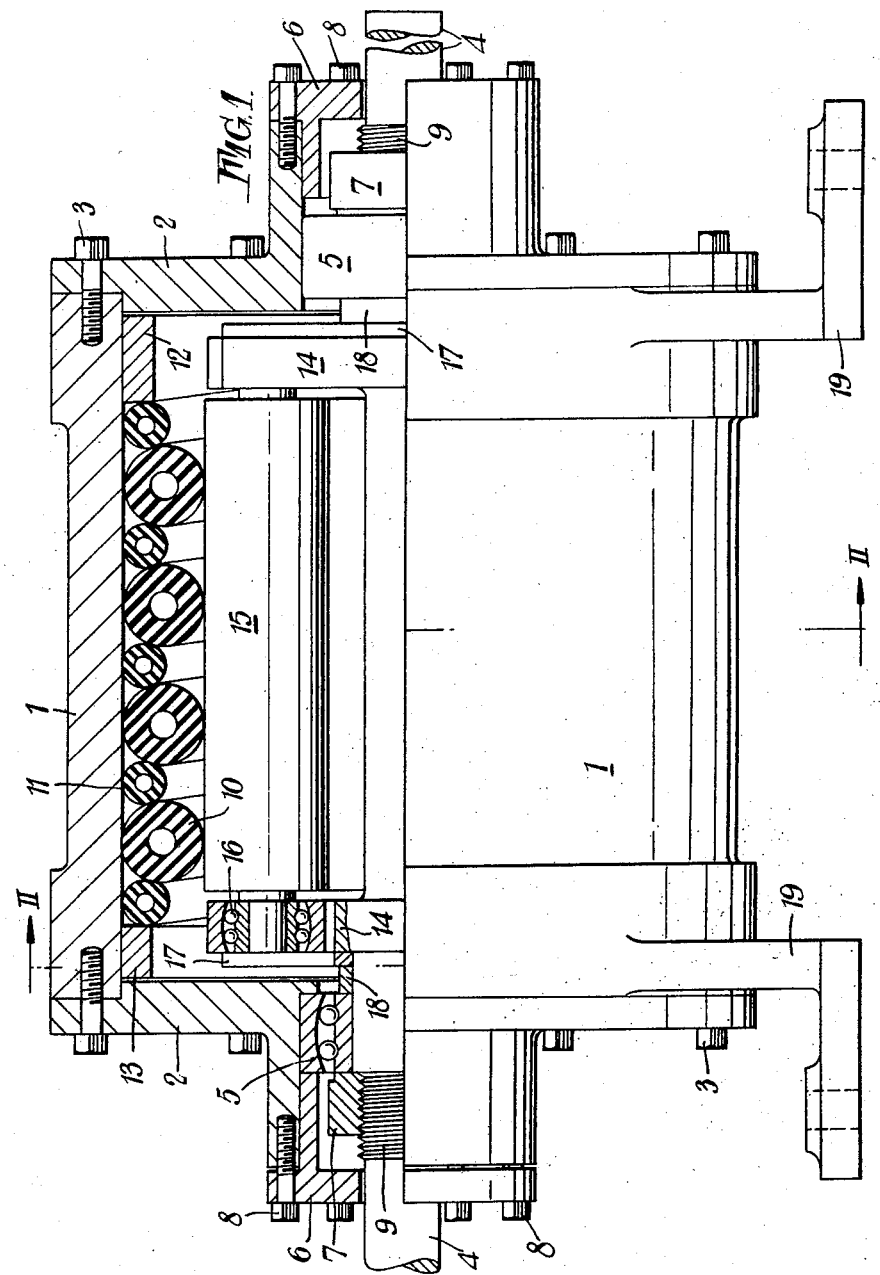
Figure 1 is a part-sectional elevation of a rotary pump.
Figure 2:
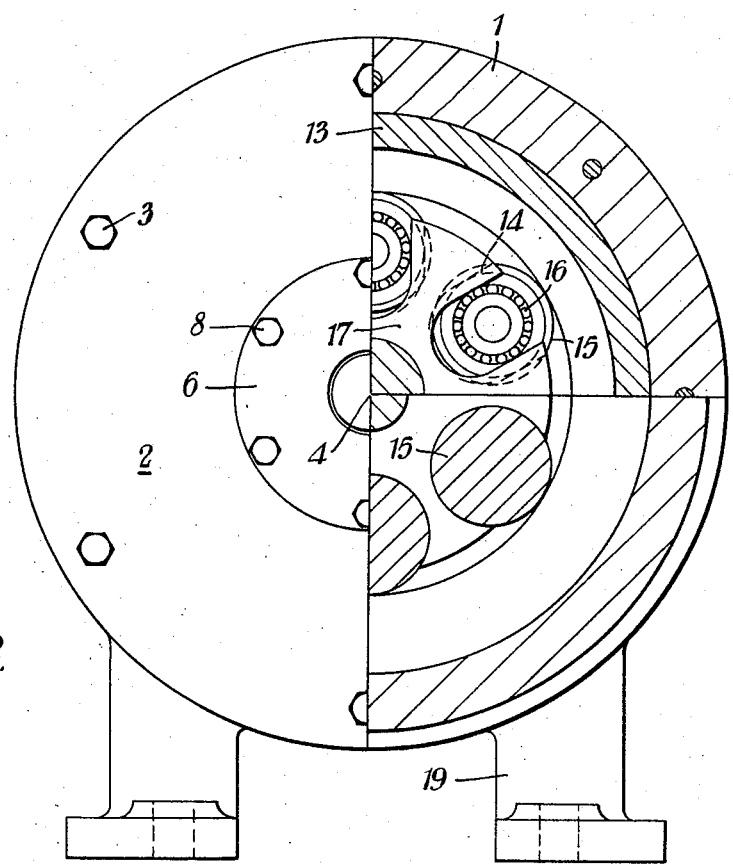
Figure 2 is a half-sectional end view of the pump shown in Figure 1, the section being taken on the line II—II of Figure 1.

Referring now to Figures 1 and 2 of the drawings there is shown a rotary pump having a hollow cylindrical outer casing 1, onto each extremity of which end covers 2 are secured by means of screws 3. The covers 2 support a central driving shaft 4 in two bearings 5, each of which is held in position by a locating bearing cover 6, and a locating nut 7. The covers 6 are attached to the end covers 2 by screws 8, and each nut 7 co-operates with threading 9 formed on the shaft 4.

A coil of tubing 10 made of rubber or like resilient material of higher deformability is wound helically, in a single layer, on the inner surface of the casing 1, there being another coil of rubber tubing 11, having a diameter smaller than that of the tubing 10, wound between the coils of the tubing 10 for a purpose to be explained hereinafter. The ends of the tubing 10 enter and leave the casing 1 tangentially through holes therein (not shown). The tubes 10 and 11 are held in position by locating rings 12 and 13 which bear against the inner surfaces of the casing 1 and the end covers 2.

In the region of each of the rings 12 and 13 the shaft 4 has a disc or flange portion 14, which is formed with a number of radial slots in its periphery. Axles of six rollers 15 are held in ball bearings 16 in the radial slots of the flanges 14 by means of spiders 17, such spiders being circular discs with radial slots therein, a spacing ring 18 being positioned between each spider 17 and the ball bearings 5. The rollers are solid and can move radially in the slots, the external surface of each roller being intended to bear upon the helically extending tubing 10.

The casing 1 has legs 19 integral therewith, which legs may be of a shape suitable for fixing the pump in a desired location.

In the operation of the pump just described, the shaft 4 is rotated by a driving motor, not shown or described. Rotation of the shaft causes rotation of the rollers 15 about the axis of the shaft 4, and causes the rollers to rotate about their own axes and roll on the coil of rubber tubing 10. Owing to centrifugal action, the rollers move radially outwards and press the tubing 10 against the inner wall of the casing thus creating constrictions in the tubing 10, which constrictions, since the tube extends helically within the casing, will move along the tube with the rollers.

Each time a roller contacts the inlet end of the coil of rubber tubing, thus creating a moving constriction, it will drive the fluid in front of it and, assuming that the tubing is sufficiently resilient, it will also create a vacuum behind it, thus sucking the fluid into the tube until such time as a further roller arrives at the inlet end of the coil. The fluid so enclosed between two consecutive constrictions arrives at the outlet end of the coil, where it is discharged from the pump. Thus it will be appreciated that the fluid passes through the tube 10, due to a peristaltic action, as a series of peristaltic pumping waves. If the constrictions were fully closed, then the presence of one of them at any given moment can suffice, but in actual practice moving constrictions require some time to close and their tightness is conditioned by the limits of pressure difference on each side of the constriction. Therefore a considerable number of intervals between constrictions, that is to say, a considerable number of peristaltic waves, moving simultaneously are preferred for pumping the fluid, particularly when the speed of pumping and the pressure are high. Thus it is desirable to use a number of rollers 15 and a number of turns of the tubing 10.

The tube 11 serves to increase the resilience of the tube 10 and also serves to support the tube 10. It should be noted that, although the tube 11 is shown as being hollow, no fluid is pumped therethrough.

Several parallel helically extending coils can also be employed within the same hollow cylinder and be constricted by the same rollers. These coils can either be operated in parallel, thus increasing the volumetric output of the pump, or, alternatively, they can be operated independently at different pressures, being used at different points of a system served by the pump.

Referring now to Figures 3 and 4, there is shown a modification of the pump just described. In this modification, the pump has a hollow cylindrical outer casing 21 formed with legs 21A for fixing the pump in a desired location, an end casing 22 being fixed onto each end of the outer casing 21 by means of studs 23. Each of the casings 22 has a flanged inlet or outlet portion 24 leading into a toroidal passage 25 formed in the casing, a central hollow portion of each casing supporting a driving shaft 26 in ball bearings 27. The shaft 26 is threaded as at 28 so that lock nuts 29 may be screwed thereon to retain the bearings 27 in position, the end of the shaft 26 being splined for securing it to the shaft of a driving motor (not shown). End locating covers 30 also serve to maintain the bearings 27 in position and are secured to the end casings 22 by means of screws 30A. The shaft 26 has two flange portions 31 formed thereon near to the end casings 22. Each flange portion 31 is formed with six radial slots in its periphery, an axle 32 of a roller 33 being slidably fitted into each of said slots. Each roller 33 is tubular and is rotatable on ball bearings 34 about its own axis, although each axle 32 is not so rotatable but can only slide in the radial slots of the flange portion 31. The bearings 34 are held in position by lock nuts 35 screwed onto threaded portions 36 of the axles 32, there being cotter pins 37 for preventing the nuts 35 from working loose.

A hollow cylindrical rubber insert 38 is fitted on the inner surface of the casing 21 and is secured in the end casings 22 in a manner to be indicated briefly hereinafter. The rubber insert 38 has thick walls in which sixteen separate helically extending circular conduits or channels 39 are formed. It should be noted that, for simplicity the channels are represented in Figure 3 as though they extend longitudinally, whereas the channels appear elliptical in Figure 4 due to the fact that they do not extend perpendicular to the plane of the drawing. The channels lead into the toroidal passage 25 of the end casings 22, via extendions 25A of the passage 25.

The rollers 33 bear on the inner surface of the insert 38 and there is a hole 40, formed in one end casing 22, leading into the region where the rollers and the insert meet. The hole 40 is sealed by a plug screw 40A and the reason for such hole will be explained hereinafter.

Each casing 22 is formed with two annular grooves 41 and 42 into which annular extensions 43 and 44 of the side walls of the rubber insert 38 can fit. The grooves have side walls against which the extensions 43 and 44 can act in such a way as to form a fluid tight seal between the channels 39 and the outside of the pump. A hole such as that shown at 45, leads into each of the grooves 41 and 42 from the outside of the end casing 22, the hole being sealed by a plug screw 46 and a sealing washer 47. For positioning the rubber insert 38, the plug screws 46 are removed and a vacuum is applied to the hole, so as to suck the extensions 43 and 44 into the grooves 41 and 42. When the extensions 43 and 44 are fully inserted the vacuum is removed and the screws 46 are replaced. A similar means of providing a fluid tight seal is also employed for sealing the flanged inlet or outlet portions 24 of the end casing 22, to inlet and outlet pipes.

The operation of the pump shown in, and described with reference to Figures 3 and 4, is similar to that of the pump shown in, and described with reference to Figures 1 and 2. When the shaft 26 is rotated by the driving motor the axles 32 of the rollers 33 rotate about the axis of the shaft 26 but not about their own axes, whereas the rollers 33 rotate, in the bearings 34, both about their own axes and the axis of the shaft 26, and roll on the inner surface of the rubber insert 38. The fluid to be pumped enters the toroidal passage 25 of one end casing 22 through the inlet flange portion 24 thereof and passes through the passage extensions 25A to the channels 39. The axles 32 of the rollers slide radially outward in the slots formed in the flange portion 31 due to centrifugal action and thus the rollers compress the rubber insert and form a number of moving constrictions in the channels 39. Fluid caught between such moving constrictions, will be driven along the channels as a series of peristaltic waves, in a manner similar to that previously described.

When it is required to pump fluids at high pressures it is desirable to increase the centrifugal force exerted by the rollers 33 on the rubber insert 38 and this may be done by partially filling the inside of the pump with a liquid which will be carried round by the rollers. Such a liquid can be introduced through the hole 40. It will be appreciated that such a liquid must be one which does not affect the rubber insert 38 and which does not cause corrosion of the rollers.

Referring now to Figures 5 and 6, there is shown a modification of the pump shown in Figures 3 and 4. In this modification the rubber insert 38 is formed with helically extending conduits 50 which are parallelogram shaped in cross-section, as shown in Figure 6 which is a developed cross-section of the insert taken along a line which is perpendicular to the helix angle, i.e. perpendicular to the axes of the conduits at the point where the cross-section is taken. In all other respects, the pump shown in Figures 5 and 6 is the same as that shown in Figures 3 and 4. With this modification, the amount of rubber that is used to form the insert is reduced to a minimum, thereby reducing the cost of the pump. The action of the rollers 33 on the insert is somewhat modified, and the moving constrictions are formed more by virtue of a folding or deformation of the walls of the conduits rather than by mere compression of the walls of the conduits. This results in the constrictions being more easily formed and maintained, and, therefore, increases the efficiency of operation of the pump.

Referring now to Figures 7 and 8, there is shown a modification having a rubber insert 51 of which the inner and outer surfaces have the shape of the surface of revolution of part of a hyperbola. The insert 51 is formed with conduits 52 of circular cross-section, the axes of which follow the rectilinear paths 53 indicated in Figure 7. Referring now in particular to Figure 8, there is shown the manner in which the insert 51 is incorporated in the pump shown in Figures 3 and 4. In between the outer casing 21 and the rubber insert 51 is a further insert 54 which is shaped to fit between the casing 21 and the insert 51, the insert 54 being of metal. Rollers 55, only one of which is shown in Figure 8, are, as before, accommodated in radial slots formed in flange portions 31 formed on the shaft 26, but the outer surface of the rollers is shaped to correspond with the inner surface of the insert 51 when the latter is compressed by the rollers 55 moving outwardly in their slots. In all other respects, the pump, part of which is shown in Figure 8, is the same as that shown in Figures 3 and 4. With this modification it is considerably easier to manufacture the rubber insert 51 since the conduits follow rectilinear paths. The conduits 52 can be made cone-shaped so that it is possible to vary the velocity of flow in accordance with operational requirements, the radii of inlets and outlets of the conduits being such that constancy of volumetric flow is maintained.

The number of channels 39 or 50 is shown as being sixteen. However, it will be appreciated that the number and pitch of such channels may be varied in accordance with the rate at which the pump is required to deliver liquid.

In the pumps shown in and described with reference to the accompanying drawings, the rollers are free to move outwardly in their slots under centrifugal action when the pump is in operation. However, when the pump is not in operation, the rollers are returned to the inner ends of their slots either under the action of the resilient conduit walls, and any fluid under pressure contained in the conduit, or, depending upon the relative positions of the rollers and the pump, under the action of gravity.

I claim:

1. A rotary pump comprising a central driving shaft, two discs mounted on said shaft and spaced from one another, wall portions in said discs defining at least one radial slot in each of said discs, at least one roller mounted in said slots for movement in a direction outward from and radial to said shaft under centrifugal action when the shaft is rotated, a casing spaced from and surrounding said shaft, and a conduit of resilient material extending around the inner surface of the casing.

2. A pump as claimed in claim 1, wherein each roller is solid and has trunnion axles integral therewith, there being bearings mounted on said axles and slidably disposed in said slots.

3. A pump as claimed in claim 1, wherein each roller comprises an axle which is slidably disposed in said slot, bearings mounted on said axle, and a hollow cylindrical roller member mounted on said bearings for rotation relative to said axle.

4. A rotary pump comprising a central driving shaft, two discs mounted on said shaft and spaced from one another, wall portions in said discs defining a plurality of radial slots in each of said discs, a plurality of rollers mounted in said slots for movement in a direction outward from and radial to said shaft under centrifugal action when the shaft is rotated, a casing spaced from and surrounding said shaft, and a conduit of resilient material wound helically on the inner surface of the casing.

5. A pump as claimed in claim 4, wherein a further resilient conduit of smaller diameter than the first-mentioned conduit is wound between adjacent turns of said first-mentioned conduit.

6. A rotary pump comprising a central driving shaft, two discs mounted on said shaft and spaced from one another, wall portions in said discs defining a plurality of radial slots in each of said discs, a plurality of rollers mounted in said slots for movement in a direction outward from and radial to said shaft under centrifugal action when the shaft is rotated, a casing spaced from and surrounding said shaft, a hollow cylindrical insert of resilient material extending around the inner surface of the casing and wall portions of said insert defining within the insert at least one conduit which also extends around the inside of the casing.

7. A pump as claimed in claim 6, wherein said conduit is substantially circular in cross-section, the cross-section being taken perpendicular to the axis of the conduit.

8. A pump as claimed in claim 6, wherein said conduit is substantially parallelogram-shaped in cross-section, the cross-section being taken perpendicular to the axis of the conduit.

9. A rotary pump comprising a central driving shaft, two discs mounted on said shaft and spaced apart from one another, wall portions in said discs defining a plurality of radial slots in each of said discs, a plurality of axles slidably mounted in said slots for movement in a direction outward from and radial to said shaft under centrifugal action when the shaft is rotated, bearings on each of said axles, hollow roller members co-axial with said axles and mounted on said bearings, each roller member having the shape of the surface of revolution of part of a hyperbola, a casing spaced from and surrounding said shaft, and a hollow resilient insert extending around the inner surface of the casing, the inner and outer surfaces of the insert having the shape of the surface of revolution of part of a hyperbola, and the insert being formed with conduits extending rectilinearly through such insert and extending around the inside of the casing.

10. A rotary pump comprising a central driving shaft, two discs mounted on said shaft and spaced apart from one another, wall portions in said discs defining at least one radial slot in each of said discs, at least one roller mounted in said slots for movement in a direction outward from and radial to said shaft under centrifugal action when the shaft is rotated, a casing spaced from and surrounding said shaft, wall portions in one end of said casing defining a hole communicating with the interior of the casing, means for closing said hole, and at least one resilient conduit, for the fluid to be pumped, extending around the inner surface of said casing.

References Cited in the file of this patent

UNITED STATES PATENTS

| | | |
|---|---|---|
| 2,314,281 | Knott | Mar. 16, 1943 |
| 2,617,362 | Parsons | Nov. 11, 1952 |
| 2,677,329 | Owen | May 4, 1954 |
| 2,693,766 | Seyler | Nov. 9, 1954 |
| 2,696,173 | Jensen | Dec. 7, 1954 |

FOREIGN PATENTS

| | | |
|---|---|---|
| 179,324 | Great Britain | May 8, 1922 |
| 467,288 | Great Britain | June 15, 1937 |